(12) United States Patent
Starikov et al.

(10) Patent No.: US 8,962,151 B2
(45) Date of Patent: Feb. 24, 2015

(54) METHOD OF BONDING SOLID MATERIALS

(75) Inventors: David Starikov, Houston, TX (US); Abdelhak Bensaoula, Houston, TX (US)

(73) Assignee: Integrated Micro Sensors, Inc., Houston, TX (US)

(*) Notice: Subject to any disclaimer, the term of this patent is extended or adjusted under 35 U.S.C. 154(b) by 2288 days.

(21) Appl. No.: 11/891,429

(22) Filed: Aug. 10, 2007

(65) Prior Publication Data

US 2008/0213612 A1 Sep. 4, 2008

Related U.S. Application Data

(60) Provisional application No. 60/837,822, filed on Aug. 15, 2006.

(51) Int. Cl.
*B23K 26/00* (2014.01)
*B23K 1/00* (2006.01)
*B23K 1/20* (2006.01)
*B23K 26/06* (2014.01)
*B23K 26/36* (2014.01)
*C04B 37/02* (2006.01)
*C09J 5/02* (2006.01)

(52) U.S. Cl.
CPC ............ *B23K 1/0008* (2013.01); *B23K 1/20* (2013.01); *B23K 26/0084* (2013.01); *B23K 26/0604* (2013.01); *B23K 26/0608* (2013.01); *B23K 26/365* (2013.01); *C04B 37/026* (2013.01); *C09J 5/02* (2013.01); *B23K 2203/04* (2013.01); *B23K 2203/10* (2013.01); *B23K 2203/18* (2013.01); *C04B 2237/12* (2013.01); *C04B 2237/123* (2013.01); *C04B 2237/125* (2013.01); *C04B 2237/127* (2013.01); *C04B 2237/34* (2013.01); *C04B 2237/341* (2013.01); *C04B 2237/345* (2013.01); *C04B 2237/365* (2013.01); *C04B 2237/366* (2013.01); *C04B 2237/403* (2013.01); *C04B 2237/64* (2013.01); *C04B 2237/72* (2013.01); *C09J 2400/166* (2013.01)
USPC .......................................................... 428/612

(58) Field of Classification Search
None
See application file for complete search history.

(56) References Cited

U.S. PATENT DOCUMENTS

| | | | |
|---|---|---|---|
| 6,145,438 A | 11/2000 | Berglund et al. | |
| 6,547,124 B2 | 4/2003 | Shah et al. | |
| 6,809,291 B1 * | 10/2004 | Neil et al. | 219/121.76 |
| 7,121,402 B2 | 10/2006 | Van Heerden et al. | |
| 2002/0182436 A1 * | 12/2002 | Weihs et al. | 428/635 |
| 2006/0219759 A1 | 10/2006 | Duckham et al. | |

OTHER PUBLICATIONS

Zhang et al., Enhancement of ceramic-to-metal adhesive bonding by excimer laser surface treatment, Apr. 1997, Material Letters vol. 30 pp. 327-332.*

(Continued)

*Primary Examiner* — Adam Krupicka
(74) *Attorney, Agent, or Firm* — Claude E. Cooke, Jr.; Cooke Law Firm

(57) ABSTRACT

Improved methods of bonding solid materials include a step of fabricating a micro-column array (MCA) on at least one surface to be bonded. The MCA formation process can be modified to cause and/or prevent chemical alteration of the surface being treated or to deposit a coating on the surface. In a preferred embodiment, the MCA is fabricated by laser treating the surface, such as by laser ablation.

8 Claims, 9 Drawing Sheets

(56) References Cited

OTHER PUBLICATIONS

N.A. Fleck, G.M. Muller, M. F. Ashby, and J.W. Hutchinson; Strain Gradient Plasticity: Theory and Experiment; Acta Metall. mater. vol. 42, No. 2, pp. 475-487, 1994; Printed in Great Britain.

Duckham, Brown, Besnoin, Ven Deerden, Knio and Weihs; Metallic Bonding of Ceramic Armor Using Reactive Multilayer Foils; The American Ceramic Society, Cocoa Beach, Florida, Jan. 25-30, 2004, pp. 597-603.

Dai, Zhang, Wang, Lin and Jiang; Optical resonant modes in InGaN MQW/GaN micr-cone; Current Applied Physics, vol. 2, Issue 5, Oct. 2002, pp. 383-387.

Ghoshal, Kar and Chaudhuri; Synthesis and optical properties of nanometer to micrometer wide hexagonal cones and columns of ZnO; Journal of Crystal Growth, vol. 293, Issue 2, Aug. 1, 2006, pp. 438-446.

Lexis Search; Search Terms "micro-column-array w/p (bond! or join! or connect! or attach!)"; p. 1.

Lexis Search; Search Terms (laser-ablation /s surface) /p (bind! or join! or connect! or bond!); p. 1.

Lexis Search; Search Terms micro-column-array /p (join! or brazing or adhe!); p. 1.

Lexis Search; Search Terms micro-column-array and (join! or brazing or adhe!) and laser; p. 1.

* cited by examiner

METHOD OF BONDING SOLID MATERIALS

This application claims the benefits of priority under 35 U.S.C. §119(e) to U.S. Provisional Patent Application No. 60/837,822, filed Aug. 15, 2006, the entirety of which is incorporated herein by reference.

BACKGROUND OF THE INVENTION

1. Field of the Invention

This disclosure pertains to a method of bonding solid materials. More particularly, it relates to bonding different materials with a method that includes formation of a micro-column array (MCA) on at least one surface.

2. Description of Related Art

Formation of Micro-Column Arrays (MCA) by laser processing of a silicon target irradiated with an excimer laser was reported several years ago. MCA consist of densely packed micro-cones, also called micro-columns, separated by cone-shaped cavities. These results have been duplicated in reactive and neutral atmospheres using a large variety of pulsed laser sources. The general feature of these structures is their protrusion above the initial surface of the sample by 10-20 μm. However, under exposure of silicon to radiation from a femtosecond laser the micro-cones are formed by etching the Si wafer and the micro-columns—i.e., material not removed by etching—are actually situated below level of the initial surface.

One of the areas that can benefit from employment of the MCA technology is bonding or joining of various solid materials. Bonding processes, also referred to as joining, are essential for large-scale manufacturing of components that employ titanium and aluminum base alloys, steels, ceramics, and composite structures. In general, bonding processes for similar metals include welding, brazing, and solid-state diffusion bonding. Bonding of dissimilar materials is much more complicated, especially at elevated temperatures, because compensation for the difference in the coefficients of thermal expansion (CTE) is required. Also, changes in chemical and structural properties that may occur during the thermally induced stress must be considered.

One of the most important parameters determining the mechanical properties of an interface is the ideal work of adhesion, $W_{ad}$, which is defined as the bond energy needed (per unit area) to reversibly separate an interface into two free surfaces, neglecting plastic and diffusional degrees of freedom. Formally, $W_{ad}$ can be defined in terms of either the surface and interfacial energies (relative to the respective bulk materials), or by the difference in total energy between the interface and its isolated slabs:

$$W_{ad} = \sigma_{1v} + \sigma_{2v} - \sigma_{12} = (E_1^{tot} + E_2^{tot} + E_{12}^{tot})/A_s$$

Here, $\sigma_{iv}$ is the surface energy of slab i, $\sigma_{12}$ is the total interface energy, $E_i^{tot}$ is the total surface energy of slab i, and $E_{12}^{tot}$ to is the total energy of the interface system. $A_s$ represents the total specific interface area. The total energy $E = W_{ad} \times A_s$ required to separate layers will be proportional to this area, which may be greater than the area of a flat layer.

Although not predicted by classical models, an increase in flow stress is seen during deformation when the observed phenomenon is on the order of a micron and inhomogeneities are present. For example, Fleck et al. showed that when loaded in torsion, a wire displays greater strength for smaller radii (Fleck, G. M. Muller, A M. F. Ashby, and J. W. Hutchinson, Acta Metallurgical Materials 42, 475(1993)). Other authors have observed this type of effect in other systems, including bending, indentation hardness, and particle hardened alloys.

Employment of Micro-Column Arrays (MCA) can improve bonding between any solid materials performed by using adhesive or specialty brazing by not only increasing the area of the interface and reducing the stress due to the synergetic effect of the micro-deformations of single micro-cones, but also by promoting better wetting of the layer surface by the adhesive or the braze material due to the highly developed surface morphology. Thus employment of MCA for bonding or joining dissimilar components can significantly improve the bonding quality. "Bonding" as used herein refers to any process by which two materials are attached to one another by using a third material between them referred to as "bonding material"—e.g., melting brazing material or placing an adhesive between the materials to be bonded. For purposes of this disclosure, "bonding" and "joining" are synonymous and may be used interchangeably. "Bonding material" refers to anything placed between the two materials to be bonded that becomes part of the final bond. It includes, but is not limited to, various adhesives (e.g., epoxies), brazing, sintering materials, and solder. In the case of braze, for some applications it may be desirable to place a prebraze on a surface prior to applying the braze. Thus, prebraze is also a "bonding material" as the term is used in this disclosure.

Employment of epoxies and active brazing are two common methods currently used for solid material bonding. In many applications, mechanical or epoxy bonding limit design flexibility, have an undesirable appearance, and/or lower reliability due to poor epoxy strengths. Thus, complex and expensive metallic joining compounds that can wet and bond a variety of very difficult to join materials are used.

Brazing is widely accepted as a viable method for joining metals and ceramics. Brazing technology is particularly important in applications where metal ceramic composites cannot be used. These applications involve joining of highly dissimilar materials and the resulting joint has to sustain very high thermal and mechanical stresses. One example of conventional active metal brazing between titanium and fluorosilicate machinable ceramic-glass is given by using a 64 Ag-34.5 Cu-1.5 Ti (wt. %) brazing alloy. The reaction between the braze alloy and both materials at a temperature of 830° C. in vacuum leads to formation of multilayered interfaces with an average shear strength of more than 85% of the glass-ceramic bulk strength. A metal-ceramic composite substitute has been produced by joining a metal plate to a ceramic substrate by using a brazing material in a paste form comprising Ag—Cu-Active Metal-TiO powder. 97(Ag28Cu)3Ti and 97(Ag40Cu)3Ti (wt. %) braze alloys exhibited good performance for brazing of $Al_2O_3$ in vacuum at temperatures up to 1200° C. Brazing alloys for joining metal and ceramic plates can also contain 70-75 wt. % Ni, 45-55% wt. % Co, and 0.5-5 wt. % Ti.

There have been several approaches using conventional reflow soldering for bonding between ceramic and metal components; however, most of the approaches are either too complex, difficult to assemble, or ineffective.

Most ceramics, for example, are joined to other components using adhesives, fasteners, or specialty brazes. The latter method, specialty brazing, produces the strongest joints. They are also relatively better able to withstand high-temperature applications. Braze is sandwiched between the metallic and ceramic components and heated to the melting temperature (typically around 700° C.). Since the metal and ceramic components contract at different rates upon cooling, large thermal stresses develop at the interface. These stresses can cause the components to delaminate, limiting the application of brazing to metal/ceramic joints that are 1.0 square inch in area or less. Given this inherent difference in thermal contraction and the resulting difficulty, there are no proven methods for bonding large metallic and ceramic components together.

A very important application area of high-temperature bonding of dissimilar materials is in the aerospace and military industries, where bond resistance to high and rapid thermal and mechanical loads is required. In particular, ceramic radomes used in various aerospace vehicles exhibit low weight, high temperature strength, electromagnetic transmissibility, and thermal insulation at boundary layer temperatures over 425° C. The problems associated with the bond durability stem from fundamental differences in the CTE and thermal conductivity. The ceramic has a relatively low CTE, and the metal missile body has a relatively high CTE. In addition, the thermal conductivities are very different too, which actually adds to the problem. Under conditions of rapid temperature increase at the external surfaces of a radome or nose cone, as occurs in flight due to aerodynamic heating effects, it is found that the radome mounting bracket of the metal airframe may become hotter than the ceramic radome because of the differing thermal conductivity characteristics.

SUMMARY OF INVENTION

A method for bonding two objects comprising forming a micro-column array on a surface of at least one of the objects, applying a bonding material to at least one surface of the objects, and bonding the objects is disclosed.

DETAILED DESCRIPTION

The present disclosure relates to the use of one or more Micro-Column Arrays (MCA) to improve bonding between surfaces, which may be the same, similar, or even very dissimilar materials. Because of the inherent difficulty in bonding dissimilar materials, this disclosure and the examples herein will focus on such applications. However, it will be apparent that the disclosed methods may be utilized for bonding a wide variety of materials. Therefore, the disclosed methods are applicable to bonding in general and not solely to bonding dissimilar materials.

Figure 1:
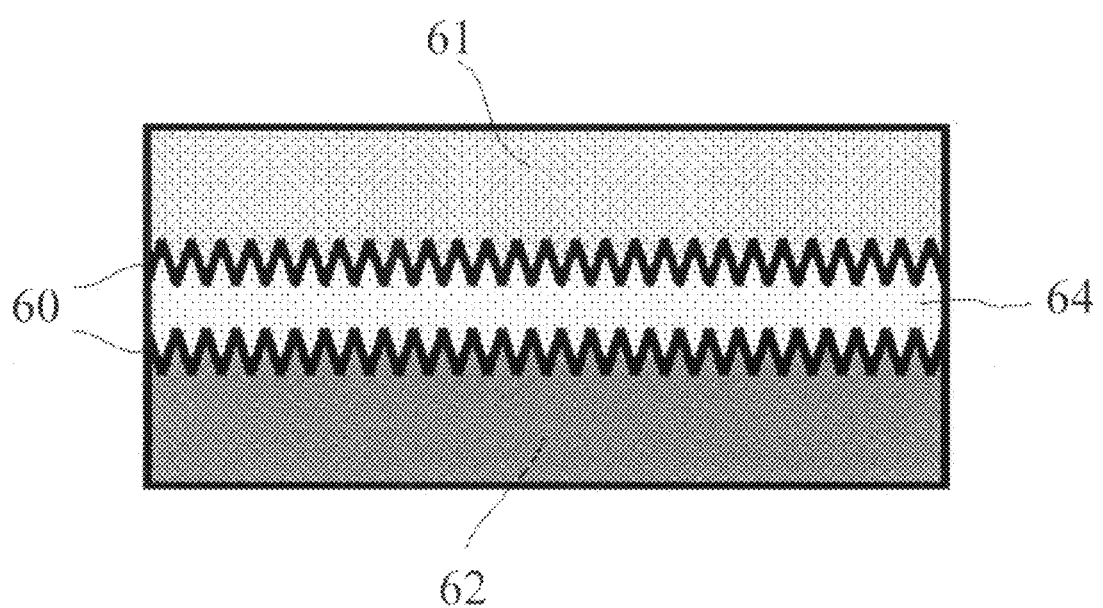
FIG. 1 shows a cross section of two materials bonded in a preferred embodiment of the disclosed method.

A MCA is formed on one or both surfaces to be bonded. This may be performed by any method for creating MCA or an equivalent structure, with laser treatments being preferred. Any process for bonding materials may be used to bond the materials after the MCA is formed. The preferred method is brazing, but other methods, including but not limited to using solder or adhesive, may be used instead. In most embodiments, a bonding material is placed on one or both surfaces. Depending on the application and the materials used, the bonding material may be placed on the substrate surface before or after MCA formation. The surfaces, one or both of which may now be coated with bonding material, are then brought into contact with one another, with the bonding material in between. Depending on the bonding method, the bonding material may be heated (in case of braze or solder), cured (in case of adhesive), or otherwise activated. Depending on the materials and bonding material, some amount of pressure may be necessary to keep the bonded parts in contact and to improve wetting of the material surfaces by the bonding material. FIG. 1 illustrates a preferred embodiment, where MCA 60 formed on the surface of the first material 61 and the second material 62. The bonding material 64 is placed in between two MCA-structured surfaces. The "sandwich" structure is then processed to form a bond.

MCA are preferably formed by laser treating a surface, but can be formed by different methods including electron and ion beam processing (Lun Dai, Bei Zhang, Ruo Peng Wang, Jing-Yu Lin and Hong-Xing Jiang Optical resonant modes in InGaN MQW/GaN micro-cone. Current Applied Physics Volume 2, Issue 5, October 2002, Pages 383-387; Berglund et al. U.S. Pat. No. 6,145,438, 2000), photolithography and etching (I. K. Kwon and T. Matsuda T., Photo-polymerized microarchitectural constructs prepared by microstereolithography (muSL) using liquid acrylate-end-capped trimethylene carbonate-based prepolymers; Shah et al. U.S. Pat. No. 6,547, 124 B2), and selective growth (synthesis) (Tandra Ghoshal, Soumitra Kar, and Subhadra Chaudhuri, Synthesis and optical properties of nanometer to micrometer wide hexagonal cones and columns of ZnO. Journal of Crystal Growth Volume 293, Issue 2, 1 Aug. 2006, Pages 438-446). However, each of these methods has limitations resulting from the requirements to various material properties, such as chemical composition, electrical conductivity, surface quality, crystalline quality, melting temperature, etc. Laser ablation is preferred because it allows processing of virtually any material by selection of an appropriate laser and optimized processing protocols.

In the preferred embodiment, MCA are produced by pulsed laser ablation of the substrate material combined with mechanical translation of sample material to create cone-shaped micro tips interspersed with cone-shaped micro cavities. The formation of cone-shaped micro-columns in an array protruding above the surface is the result of redistribution of surface material melted by the laser ablation process. One important parameter in MCA formation through laser ablation is the laser fluence, which should heat the surface material to near or just slightly above melting point. A second important parameter is the number of laser pulses applied to any particular surface location. MCA may be generated on many material surfaces, including the following: Fe, Si, Ge, Ag, Au, W, Mo, Ta, Nb, $V_2O_5$, Ni, steel alloys (including stainless steel alloys), Ti alloys, as well as AlN (Aluminum Nitride), SiC (Silicon Carbide), BAS (Barium Aluminum Silicate), and IRBAS (Intrinsically Reinforced Barium Alumo-Silicate) ceramics.

Figure 2:
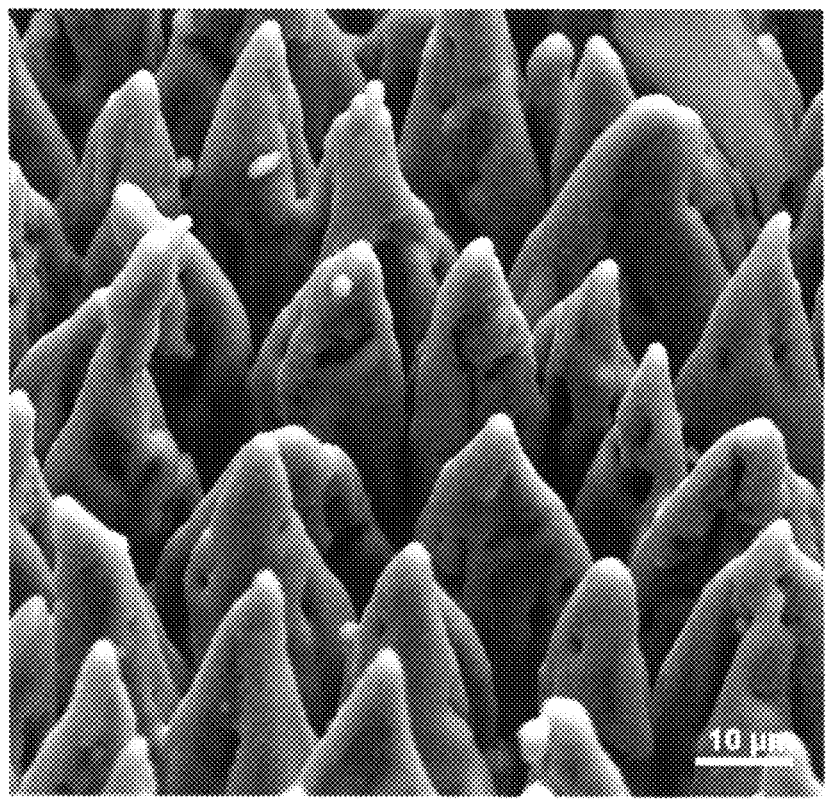
FIG. 2 is a SEM photograph of a MCA formed on titanium.

FIG. 2 is a Scanning Electron Microscope (SEM) photograph of an MCA on titanium (Ti). The surface of Ti is covered by a dense array of micro-cones with average spacing of 15-20 m. Formation of this kind of structure occurs under a large number of laser shots each having a fluence close to the threshold of the target material melting point. The structures emerge due to re-distribution of the ablated and/or melted target material.

Bonding techniques for similar metals include welding, brazing, and solid-state diffusion bonding, including high temperature applications. Bonding of dissimilar materials is much more complicated, especially at elevated temperatures, because it is necessary to compensate for the difference between the coefficients of thermal expansion (CTE) for each material—i.e., the bonded materials contracting at different rates during cooling. Also, changes in chemical and structural properties that may occur during the thermally induced stress must be taken into account. Since bonding of dissimilar materials, particularly in high-temperature applications, is an area that can benefit significantly from the advantages provided by the disclosed method, this disclosure uses brazing to exemplify the method, but the advantages of the method are equally applicable to other bonding materials and methods such as adhesives or soldering.

An MCA can be fabricated on the surface of any solid inorganic or organic material, including high-temperature ceramics and refractory metals, with laser treatment. The necessary condition is optical absorption of the laser radiation by the solid. Such absorption normally depends on the optical properties of the solid, and laser parameters such as wavelength, power, and pulse repetition rate. Furthermore, absorption of laser radiation at a particular wavelength by a solid is a preferred, but not a necessary, condition, since a solid material can be coated with a layer that absorbs the laser radiation in that particular wavelength range and this would be enough to initiate the MCA fabrication process. The solid material can also have a high-roughness surface, which will initially increase the absorption of the laser radiation with a positive feedback as the process is repeated. Such method allows fabrication of MCA on ceramic and even sapphire substrates by using a laser with a radiation wavelength of 1.06 μm, normally transmittable by these materials.

In theory, MCA fabrication speed is directly proportional to average laser power. This relationship indicates that the MCA fabrication process is highly scalable and can be made more efficient by increasing laser power. Lasers of up to 5 kW are currently available, but more powerful lasers may be used as they become available. Another advantage of the MCA fabrication process is the possibility of their formation on curved and complex surfaces. This can be achieved by pre-programming the three-dimensional mechanical translation of the substrate during the laser ablation process, which may be readily accomplished using programmable stepper and servo motors.

The formation of the MCA from capillary waves occurs due to the variation of the surface absorptivity with respect of the incidence angle of the laser radiation. The absorptivity of a solid decreases with increasing of the incident angles, for any radiation polarization. If the laser fluence is close to the melting threshold, the surface structures protruding towards the laser beam axis remain solid. At the same time, the areas oriented perpendicularly to the laser beam axis are evaporated at each laser pulse, and the evaporated material condenses on relatively cold protruding structures. On the other hand, the inhomogeneity of the temperature distribution along the solid surface leads to the redistribution of the melt due to temperature dependence of the surface tension coefficient. The relative contribution of these two factors (evaporation-condensation and melt displacement) to the process of the MCA formation depends both on the material and the environment.

The spatial period between micro-columns is determined by the capillary waves on the solid and is typically 10-20 μm for most studied metals. This period is determined by the period of the capillary waves, which in turn depends on the depth of the molten layer. Thus, the spatial period of micro-columns should depend on the laser pulse duration. The formation of MCA occurs in a narrow window of processing parameters. The laser fluence should be close to the threshold of melting, or slightly above but not higher than a fluence that can cause formation of holes due to intensive evaporation of the material and re-deposition in the surrounding area. Such fluence depends on several material properties, including melting and evaporation points, vapor pressure at various temperatures, and reactivity with a particular ambient, and can be experimentally determined for each material by using typical MCA process setup steps that will be described below. The number of laser pulses at any given location should be high (of the order of $10^3$) in order to develop the required instability.

Formation of self-organized arrays of MCA on a solid surface requires specific experimental conditions. As has been noted above, the laser fluence, as one parameter that controls the MC formation, should be close to or slightly above the melting threshold of the solid. The second important parameter is the number of laser pulses. It should exceed a certain threshold value, from $10^2$ to $10^4$, depending on material's absorption level at the laser maximum wavelength (see Condition 2 below).

The laser source should have a high repetition rate in order to deliver a sufficiently high pulse number to the solid surface in a reasonably short exposure time. In general, the solid material has to be highly absorbing at the chosen laser wavelength. The laser fluence absorbed by the solid surface should not exceed several $J/cm^2$. Breakdown of the surrounding medium should be avoided in order to limit both shock waves and plasma development in the medium and their detrimental effect on the MCA. The threshold for air or (other gas) breakdown decreases in the UV and mid-IR region to around 10 μm, so laser sources operating in these ranges of wavelengths are not suitable for generation of MCA in gaseous ambient, but can be used for MCA fabrication in vacuum conditions. The pulse duration has to be short to avoid heat propagation to the solid substrate and its deep melting, which may destroy the MCA.

The characteristics of preferred laser sources are listed in Table 1. All the listed lasers are commercially available and have long lifetimes of several thousand hours.

TABLE 1

Exemplary laser sources suitable for MCA generation

| Laser type | Wavelength (nm) | Pulse duration (ns) | Repetition rate (kHz) |
|---|---|---|---|
| Cu vapor | 514 | 10-20 | 10-20 |
| Au vapor | 635 | 10-20 | 10-20 |

TABLE 1-continued

Exemplary laser sources suitable for MCA generation

| Laser type | Wavelength (nm) | Pulse duration (ns) | Repetition rate (kHz) |
|---|---|---|---|
| Nd:YAG | 1064 | 20-120 | 5-60 |
| Nd:YAG (2nd harmonics) | 532 | 25-80 | 5-60 |

To generate MCA on extended areas of a solid or according to a desired pattern, the laser beam should be scanned over the solid surface. This is preferably achieved by placing the sample on a computer-driven X-Y stage. For example, the MCA structure shown in FIG. 2 was generated by scanning the laser beam with a 50% overlap between the consecutive scans.

In a preferred embodiment, the MCA should be fabricated on the surface of each bonding component, however employment of MCA on only one of the two surfaces being bonded will be also beneficial. Depending on the application and the materials, post-treatments, such as annealing or etching, can be applied to the MCA in order to form or selectively remove a surface layer (e.g., an oxide). The application of the adhesives and brazing as well as the bonding processes can be performed by using conventional procedures developed for various materials.

Selection of the laser treatment parameters for MCA formation is based on adjustment of the laser energy density, the pulse duration, the repetition rate, and the translation speed of the radiation absorbing sample surface, necessary for translation of the melted substance under the temperature gradient. A set of such parameters suitable for MCA formation always exists at appropriately selected conditions as a result of inhomogeneous absorption by a not ideally flat surface.

Since the formation of the MCA structure occurs during both surface heating and cooling stages, it is necessary to realize a "single-pulse" mode of substance treatment by the laser irradiation—i.e., the local surface temperature should be below the substance meting point when the next laser pulse reaches it (Condition 1). However more reproducible results can be achieved if the local surface temperature is slightly below the melting temperature of the solid.

Condition 1 affects such parameters as laser beam width and repetition rate if the translation speed is relatively low:

$$(D/V)*f=n \quad \text{(Condition 2)}$$

where D is the laser beam width, V is the translation speed, f is the repetition rate, and n is the number of laser pulses, which typically is between about $10^2$ and about $10^4$ depending on the substrate's adsorption at the laser wavelength being used.

Condition 2 applies to formation of MCA during a single scan of the laser beam. In general, there is overlapping of the laser beam during scanning back and forth for extended areas of the substrate, and Condition 2 is fulfilled due to this overlapping.

The magnitude of each of the above parameters can change within certain limits. For example, the repetition rate can change from 1 Hz to the maximum rate ($f_{max}$) at which Condition 1 will still be met.

In many cases, the unmelted material below the surface acts as a half-space thermal sink for cooling the heated surface material. In the case when the sample cannot be considered as a half-space thermal sink (e.g., with thin foils), it might be necessary to provide a heat sink equivalent to half-space.

The laser pulse energy density (J=I/S, where I is the total pulse energy and S is the area of the laser spot) determines the thickness of the melted layer. It follows from the above that J should not exceed a value that would provide for formation of a melted layer with a thickness greater than the size of the features that have been already formed on the surface (Condition 3)—i.e., $J_{min}<J<J_{max}$, where $J_{min}$ is the minimum energy necessary to melt the surface, $J_{max}$ is the energy at which either the melted layer thickness is too large to satisfy Condition 3, or the substrate material evaporates (or sublimates) at a very high rate.

The pulse duration should not exceed the time needed (depending on sample thermal conductivity) for heat to propagate at distances comparable to the characteristic period of the MCA (Condition 4), otherwise the necessary temperature gradient necessary for the melted substance transport will not be realized.

Decreasing the pulse duration while keeping a fixed energy density can result in laser ablation dominating (Condition 5), which in turn will result either in recessed (below the initial surface) MCA structures, or in their complete absence. In this case the energy density should be reduced until Condition 2 is realized.

The best ambient for realizing Conditions 1, 3, and 4 during MCA formation is a vacuum. However, MCA formation without significant changes in the chemical composition is possible in open air or under a relatively non-reactive fluid—i.e., a fluid which does not result in chemical reactions causing either intensive substance removal, or formation of films on the surface, as a result of heating. A reactive ambient can be also applied during the MCA formation in order to achieve a desired chemical composition on the MCA surface. As used herein, "ambient" or "ambient media" refer to whatever fluids (a fluid is understood to include all gases and liquids) are in contact with the surface during MCA fabrication, including a vacuum.

The method disclosed herein may be carried out using a pulsed Nd:YAG laser, such as Model: Baasel LBI 6000 918, 60 W, λ=1064 nm, 5-8 kHz. A suitable translation stage is NEAT XY-6060 Stage and TM-400-SM single axis table (Z stage), with 4.00 inch travel each and a lead screw that is accurate to within 20 µm. A suitable controller is DMC-1830 XYZ controller from Galil, interfaced to a personal computer by NI-LabView virtual instrument software. This software is used in the following example of an MCA formation process. It will be apparent to a person of ordinary skill that other controllers and/or software may be substituted in the described embodiment.

STEP 1

1.1. At a fixed laser parameter (energy, frequency, and pulse width) determine the area of the material melted by the laser spot. In order to accomplish this, determine the Z-axis shifting position relative to a selected fixed plane Z(0).

1.2. Place the sample at a distance of Z(0)–6 mm and process a meander by running program "meandr+xyz 1021_3".

1.3 Visually under the microscope determine the true position of the caustic (a caustic curve is a curve to which the ray of light, reflected or refracted by another curve, are tangents, the reflecting or refracting curve and the luminous point being in one plane) relative to the previously selected fixed plane, as well as the maximum value of Z=Z(1) at which mark from the laser spot still can be seen. For this particular optical system the spot diameter changes behind the Z shifting is slower than that in front of it. Therefore, it is preferable to use positioning behind the shifting, which is 3 mm long.

STEP 2
  2.1. Specify the energy density. For this purpose, process a series of similar surfaces for various Z. Place the sample at a distance of Z(1)+1 mm and run program "1207_2".
  2.2. Visually under the microscope determine Z(3) at which the surface morphology is most uniform.
STEP 3
  3.1. Verify MCA formation at the selected energy density (J). Place the sample at a distance of Z(3) and run program "1207_3".
  3.2. If the power density is selected right, an increase in the micro column height is observed on each following area.
  3.3. If such increase is not observed, it is necessary to increase the power density—i.e., decrease Z. For different materials the steps for decreasing Z are different, since change of J vs. Z at this part of caustic is a function of a 4th power.
STEP 4
  4.1. Determine the minimum time required for the formation of MCA with specific parameters. At Z(3) run program "1207_4".
  4.2. For the optimization of the MCA formation process, the laser spot translation step along one of the coordinates can be varied. It would be optimal if this translation step equals to the MCA period (specific for particular materials), which can be determined from Step 3.
  4.3. The frequency should be selected at the maximum satisfying Condition 1.
  4.4. The translation speed can have any value higher than that defined by condition 5 unless the higher speed results in not entire irradiation of the solid surface.
  4.5. If defocusing is not effective in optimization of J, it can be done by placing the sample into the caustic shifting and varying the energy using filters placed outside the laser cavity, such as a set of neutral density glass filters.

This program draws a mesh with a step of 100 µm Its dimensions are 1.5×1.5 mm, translation speed 2 mm/s, number of scans per a single area=10, then translation along Z at +0.5 mm, it then scans the next area, total number of areas=6.

Figure 3:
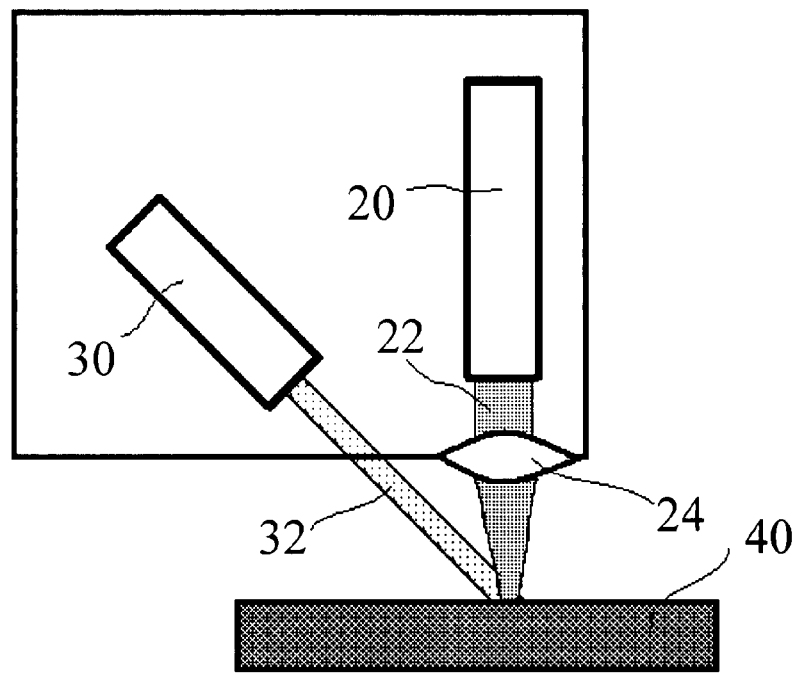
FIG. 3 illustrates a method for improving MCA fabrication by preheating the surface with an unfocused laser beam.

One way to reduce the MCA processing time at a limited average pulsed laser power is preheating of the substrate to just below the melting temperature. While convective or direct heating of large items is complicated and expensive, employment of a relatively inexpensive, medium power continuous wave IR laser with a wavelength suitable for heating the specific substrate material and with an unfocused beam directed on the same spot as the pulsed laser can be used, as illustrated in FIG. 3. In one embodiment, continuous wave laser 30 emits unfocused laser beam 32 striking substrate 40 heating the surface at the laser spot to nearly the material's melting point. Then, pulsed laser 20 emits laser beam 22, which preferably passes through optics 24 before striking substrate 40 further heating the substrate and causing MCA formation. For example, preheating the sample to 300° C. can result in ~30% reduction of the laser fluence (power) or a proportional increase in the processing speed. A 15 W Ar/Kr model 2020-05/2560 "white" laser from Spectra-Physics with radiation in a spectral range from 300 to 800 nm is one example of a laser that may be used for this purpose.

Figure 4:
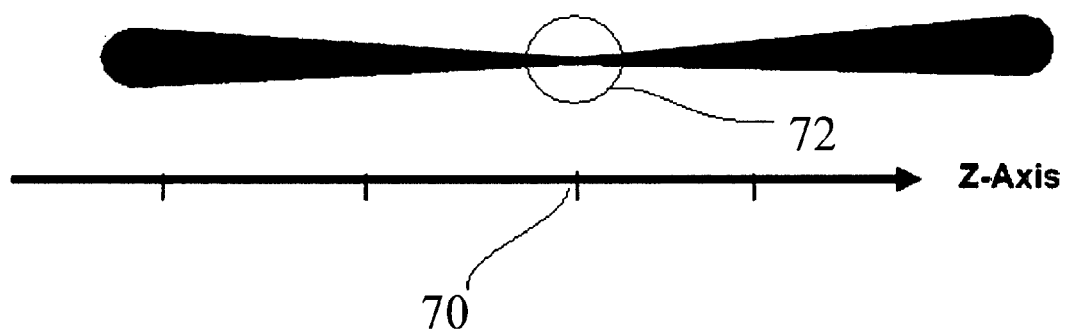
FIG. 4 is an illustration of a laser focusing method.

The laser may be calibrated to achieve more precise laser beam focusing. It is based on digital memorizing of a "zero-point" 70 on the Z-axis coordinate set by using photosensitive materials that reproduce the laser spot image. Such calibration will be performed by slow translation of the photosensitive material surface attached to the stage simultaneously in the Z direction around the focus distance and one of the X or Y directions, while performing low-power overlapping laser shots. This will result in a pattern shown in FIG. 4. The "zero-point" coordinates are those corresponding to patterned areas with minimal diameter laser spots, indicated by circle 72 in the figure.

Ideally, the pulsed laser beam is perpendicular to the material surface during MCA formation. However, this is not a critical parameter as it is believed that the angle may vary by as much as 10 or 20° without significant detrimental effect on MCA formation.

The chemical composition of the MCA surface is critical to obtaining reliable bonds produced during the brazing process. The main concern is formation of unstable intermetallic compounds that might significantly reduce the bond strength. For example, formation of some Ti Silicide modifications at the bond interface can result in the bond fracturing at very low loads—i.e., below ~1000 psi (Ti Silicide can form during brazing at temperatures around 800° C. or above when Ti in the brazing allow reacts with Si from the ceramic). Processing in reactive ambients can help form a surface that will prevent or reduce formation of intermetallics during the bonding (brazing) process. Thus, it is beneficial to tailor the chemical composition of the pre-bonded surfaces in order to prevent the formation of unstable intermetallics.

Energy Dispersive Spectroscopy (EDS) characterization showing that Si, Al, and Ba are still the main constituents of the MCA surfaces was performed on structured IRBAS material. This method did not allow identification of either oxides or nitrides. Therefore, X-Ray Photoemission Spectroscopy measurements (XPS) were performed in order to further investigate the chemical composition of the structured surfaces. Analysis of the XPS data performed using known binding energy peak shifts associated for each compounds indicate that mostly oxides and nitrides are formed during the MCA fabrication and no sign of intermetallic compounds was present.

Chemical characterization was performed on samples pre-brazed for the NanoBond® process. A metallographic sample was studied by using Electron Diffraction X-Ray Spectroscopy (EDX). The EDX spectrum of a prebrazed interface indicates presence of some titanium silicide. However, no indications of forming oxides in the MCA interface, and no significant changes in the IRBAS ceramic composition during the MCA fabrication were observed.

One of the most important benefits of the MCA technology is the ability to use a large variety of ambient media. As used herein, "ambient" or "ambient media" refer to fluid(s) in contact with the surface during MCA fabrication or a vacuum. This allows not only for control of chemical composition of MCA, but also for real time in-situ coating of the MCA structure with a desired material. For example, the formation of oxides can be promoted by using an oxygen containing ambient, such as air, or prevented by using a neutral gas ambient. The benefits of oxidizing a metallic surface can, depending in part on the application, include improved material strength, better CTE match between the surfaces being bonded, prevention of unwanted compounds, and improved wettability. In another example, Ti-coated iron MCA resulted from laser ablation of an iron sample performed in a mixture of methanol and TiCl3. Ambient media that can be used to prevent the formation of intermetallics include Krypton, Radon, Xenon, Argon, and steam. The choice of ambient media depends on the nature of the material being treated and what, if any, changes to the surface are desired for a particular application. Therefore, numerous choices for ambient media will be apparent to a person of ordinary skill practicing the disclosed method depending on the bonding application.

Figure 5:
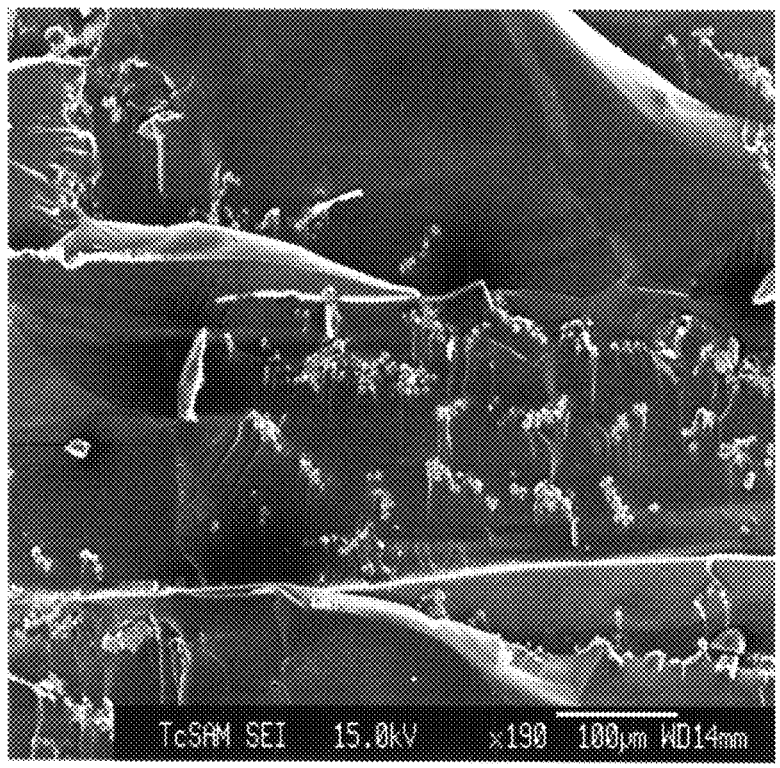
FIG. 5 is a microscope photograph of the surface structure of a MCA surface showing oxidized spherical particles. The marker corresponds to 2 μm.

FIG. 5 is an enlarged micrograph taken from the surface of one of the micro cones formed on a Ti substrate, showing spherical $TiO_2$ particles. The ability to form oxide particles on the surface of the MCA makes it possible to improve bond strength beyond the improvement due to MCA alone. The nanoscale volumes between the spherical features seen in the figure can entrap bonding material and contribute to the mechanical component of bond strength. In addition, oxidation of the metal increases wettability of the bonding material, which also increases the mechanical component of bond strength, as discussed below. Thus the presence of micro-columns, their nanoscale local features, and the modified surface chemistry results in stronger bonds.

Figure 6:
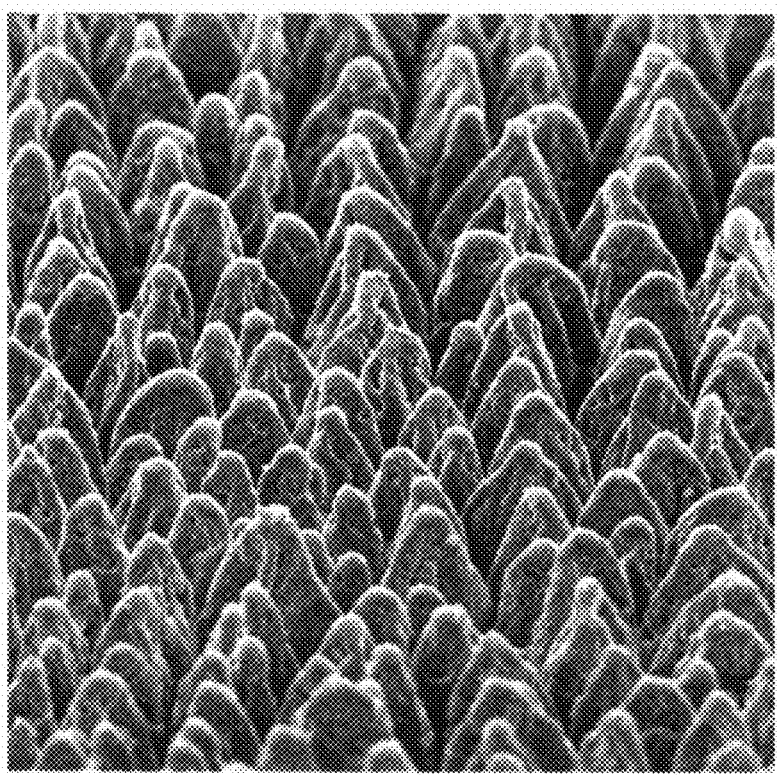
FIG. 6 is a titanium-coated MCA fabricated on an iron substrate by pulsed laser ablation in a mixture of methanol and titanium chloride.

In addition to this, the surface composition of the bonding components can be pre-tailored during MCA fabrication process by providing chemical precursors from the ambient media in order to achieve desirable properties such as, for example, improved wettability, better matching of the CTE, or prevent formation of undesirable compounds that would reduce the bonding strength (e.g., some inter-metallic layers). For example, laser ablation of Fe substrate performed in a mixture of methanol and $TiCl_3$ resulted in $TiO_2$-coated Fe MCA, illustrated in FIG. 6.

Enlargement of the specific area in the metal-ceramic interface is one of the main MCA features to improve the bonding. Simple geometric calculations show a more than 10-fold increase of the specific surface for an array of micro cones with an aspect ratio (base diameter/height) of about 1. The estimated fraction of the surface f necessary to enhance the bonding strength for a given factor is determined from the following considerations. Let So be the initial flat surface of the plate, while k is the increase of the specific area of the plate after laser treatment, $k \cong 10$. Then the total specific surface area of the plate after laser treatment S can be written as follows:

$$S = S_0(1-f) + f S_0 k$$

One important factor in bond strength is the "wettability" of the surfaces. Increased wettability corresponds with increased bonding between the bonding material—i.e., braze or adhesive—and the surface being bonded, which increases the overall bond strength. The wettability of a solid by a liquid is characterized in terms of the angle of contact that the liquid makes on the solid. The contact angle, $\theta$, is obtained from a balance of interfacial tensions and is defined from Young's Equation:

$$\sigma_{LV} \cos \theta + \sigma_{LS} = \sigma_{SV}$$

where $\sigma_{LV}$, $\sigma_{LS}$, and $\sigma_{SV}$ are the interfacial tensions at the boundaries between liquid (l), solid (s), and vapor (v). Here, s represents the force needed to stretch an interface by a unit distance (or, equivalently, the energy required to create a unit surface area of a given interface, provided that, in the case of $\sigma_{sv}$ mechanical distortion and strains are negligible). The condition $\theta < 90°$ indicates that the solid is wet by the liquid, and $\theta > 90°$ indicates nonwetting, with the limits $\theta = 0°$ and $\theta = 180°$ defining complete wetting and complete nonwetting, respectively. A large body of useful scientific information about the wettability of and spreading upon high-temperature metal and ceramic coatings comes from the application of Young's equation to metallurgical systems at elevated temperatures.

Young's equation applies to ideal surfaces that are perfectly smooth and devoid of all chemical and structural inhomogeneities. The contact angle measured on a rough surface (called the Wenzel angle, $\theta_w$) does not obey Young's equation; it is related to the equilibrium (Young) angle $\theta_y$:

$$\cos \theta_w = r \cos \theta_y$$

where r is the ratio of the true wetted area to the apparent area.

Wenzel's equation applies to equilibrium angles on rough surfaces and not to advancing and receding angles of a droplet on a rough solid surface that give rise to contact-angle hysteresis. Hysteresis (H) is defined as the difference of the advancing and receding angles (i.e., $H = \theta_a - \theta_r$) and arises because the liquid-vapor interface does not retrace its original path when it recedes on the solid, so that spreading is thermodynamically irreversible.

Because roughness hinders the contact line motion by creating energy barriers, the system can reside in any of the potential wells accessible to it that are commensurate with the vibrational (or thermal) energy of the droplet. The advancing angle is less sensitive to roughness than is the retreating angle and is usually the one measured and reported.

As surface inhomogeneities exceeding about 10 nm in size can anchor the contact line, contact-angle hysteresis is pervasive in most systems save the most carefully prepared smooth and homogeneous surfaces. In the case of reactive systems, the additional contact area due to roughness could enhance the chemical attack provided that the high surface tension of the liquid does not restrict the asperity contact with the liquid and gas entrapment at the rough interface does not minimize the solid-liquid contact.

Figure 7:
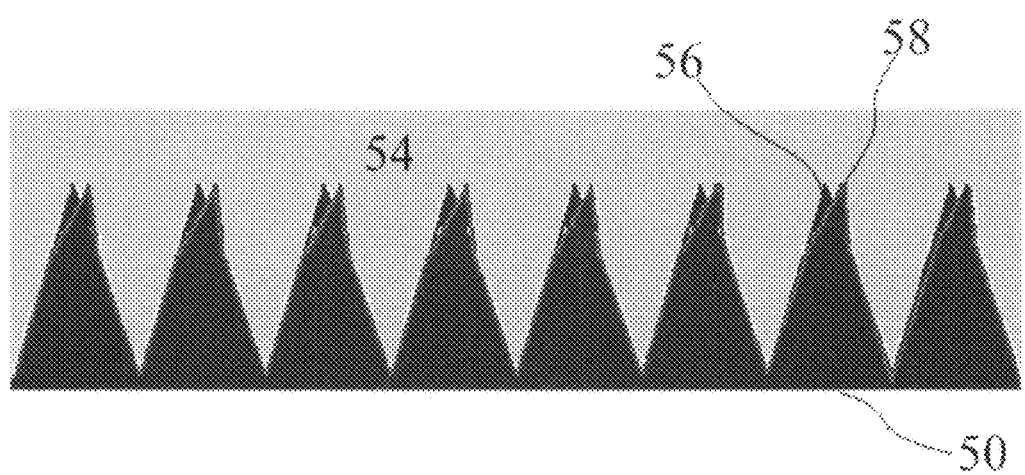
FIG. 7 is a drawing illustrating micro-deformation of cones under shear stress in the presence of an adhesive or braze.

Additional effects that will contribute to better stability bonding of the laser-treated surface are: the inherent flexibility of the micro-cones, reinforcing the bonding material (e.g., adhesive or braze), and repeated bend contours of the surface preventing hydrothermal failure. MCA are more flexible than a flat epoxy-metal interface, and will more readily deform under stress induced by either difference in CTE or under shear deformation. This is schematically shown in FIG. 1. Objects 61 and 62, with differing CTE, are bonded with bonding material 64. FIG. 7 illustrates micro-deformation of cones under shear stress in the presence of an adhesive or braze. Initially micro-cones 56 are in their original unstressed positions. When shear stress is applied, whether through differing rates of thermal expansion or contraction or another source of loading, micro-cones 56 bend or flex into new positions 58. This ability to bend absorbs some of the stress reducing the stress on the micro-cone bonding material interface and the stress in bonding material 54. This has the effect of increasing the amount of additional loading necessary to break the bond at the micro-cone bonding material interface. In other words, bending of multiple micro-cones compensates the variation of the contact length between the ceramics and metal, so that the total stress is reduced through this bending.

The disclosed method is particularly well-suited for furnaceless brazing methods. The heat for furnaceless brazing is created by placing reactive materials on or near the braze between the two surfaces being bonded and reacting them to release heat. The heat released must be sufficient to melt the braze. An intermediate step of applying a prebraze to the bonding surfaces, which may require furnace heating, prior to placing the reactive materials and braze in place may be necessary.

One example of a furnaceless brazing method is the Nano-Bond® method developed by Reactive NanoTechnologies, Inc. The method is described by A. Duckham, M. Brown, E. Besnoin, D. van Heerden, O. M. Knio, & T. P. Wells, *Metallic Bonding of Ceramic Armor Using Reactive Multilayer Foils*, American Ceramic Society Meeting, Coco Beach, Fla., Jan. 25-29, 2005, pp. 597-603, which is incorporated in its entirety herein by reference. The heat is provided by a reactive Nano- Foil®, which comprises thousands of alternating nanoscale layers of Ni and Al. An exothermic reaction between the layers is triggered by an external energy impulse. Braze and/or solder may be placed above and/or below the NanoFoil®. These materials are sandwiched between the objects being bonded, which are then pressed together prior to activating the NanoFoil®. Reactive multilayer foils are discussed at more length in U.S. patent application Ser. No. 11/393,055 filed on Mar. 30, 2006 and published on Oct. 5, 2006 (Publication No. 2006/0219759) and in U.S. Pat. No. 7,121,402 issued on Oct. 17, 2006, from patent application Ser. No. 10/814,243, the entirety of which are each incorporated herein by reference.

The main advantages of the NanoBond® method for applications that involve bonding of very dissimilar materials (e.g., metals and ceramics) are: 1) large and complexly shaped parts can be bonded without using a furnace; 2) thermal stress due to differences in the CTE that builds up during high temperature bonding can be greatly reduced by localization of the heat at the interface within the brazing layers; and 3) it is environmentally safe and cost-effective. Employment of the MCA process prior to bonding solves three current major problems that prevent commercialization of this technology: 1) poor wettability of the ceramic during the prebrazing, necessary for the NanoBond® process; 2) formation of intermetallic compounds that greatly decrease the strength of the bonds between metals and ceramics; and 3) cracking of the ceramic due to thermal stress that builds up between the brazing alloy and ceramic during the prebazing process that still has to be done in a high temperature furnace. Preliminary results from the IRBAS and Ti alloy samples bonded using the NanoBond® indicate improvement of the bond strength for MCA-structured surfaces.

The NanoBond® process is as follows. Brazing alloy is pre-applied to the components being bonded. NanoFoil® is then placed between the components. The components are properly aligned and pressed together to encourage the molten solder and braze to flow and wet the components after the NanoFoil® is activated to chemically react and produce heat to melt the solder or braze.

The need for light-weight, high-performance thermal management systems is moving from the traditional military and aerospace applications into industrial and consumer electronics as ever-increasing speeds in ever smaller devices calls for the use of new materials. Metal matrix composites such as aluminum silicon carbide, ceramics such as silicon carbide and aluminum nitride, and graphite structures such as pyrolytic graphite and foamed graphite are all being used to improve thermal performance without adding weight. On the high-temperature applications end, besides employment of conventional brazing, furnaceless bonding based on nanofoils, serving as localized heat sources, is unique in providing the ability to give a high performance thermal joint between very dissimilar high-temperature metal and ceramic materials. Such joints offer approximately ten times the thermal conductivity of thermal epoxies along with the ability to bond in air, without the use of fluxes, and to have a bond that allows rework of damaged parts. Some of the specific applications that can benefit from this are defense, space, avionics, laser systems, and high performance computers.

The following experiments were performed using Alpha-Beta Titanium Alloy (Ti-6Al-2Sn-4Zr-2Mo), IRBAS ceramic, and Brazing Alloy Incusil-ABA or high-temperature Reactive NanoFoil™.

In experiments on adhesive bonding of Ti surfaces, an MCA structure was produced via laser ablation of a solid surface by a pulsed excimer laser with an energy output of a few joules, a pulse duration from 0.002 to 1.5 µs, and a wavelength from 0.2 to 11.00 µm. Such laser characteristics allow variation of the MCA fabrication process parameters and materials used for MCA fabrication across a wide range. Mechanical property measurements on adhesive bonds formed between Ti/Ti show that the strength increased due to (i) considerable increase in surface area, and (ii) improvement of the solid/adhesive interface due to modifications in the surface chemistry. When the process is carried out in air the micro column surfaces oxidize.

Figure 8:
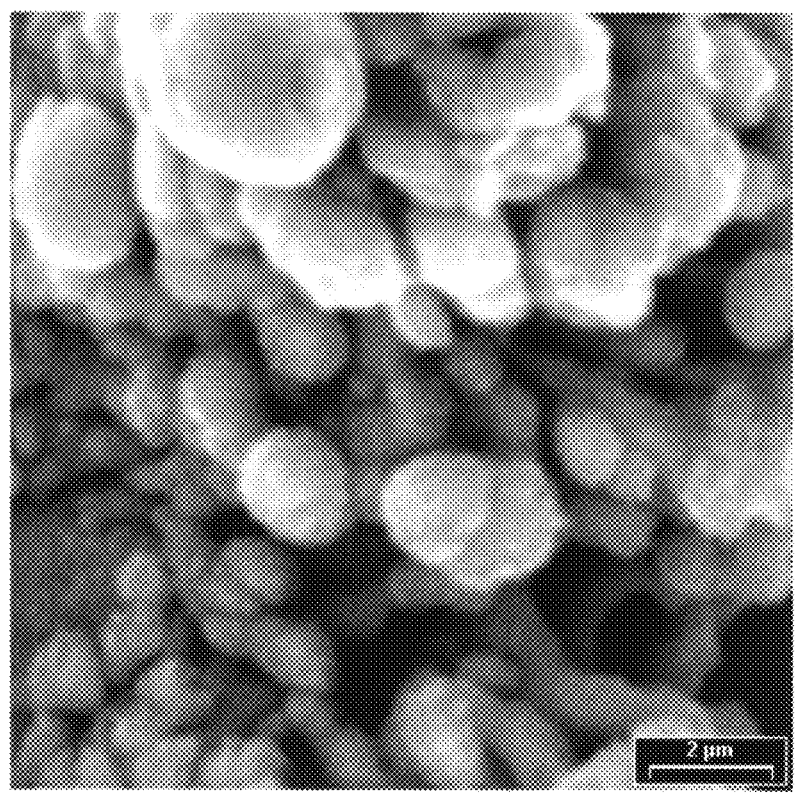
FIG. 8 is a photograph of a fractured surface showing brittle fracture of epoxy.
Figure 9:
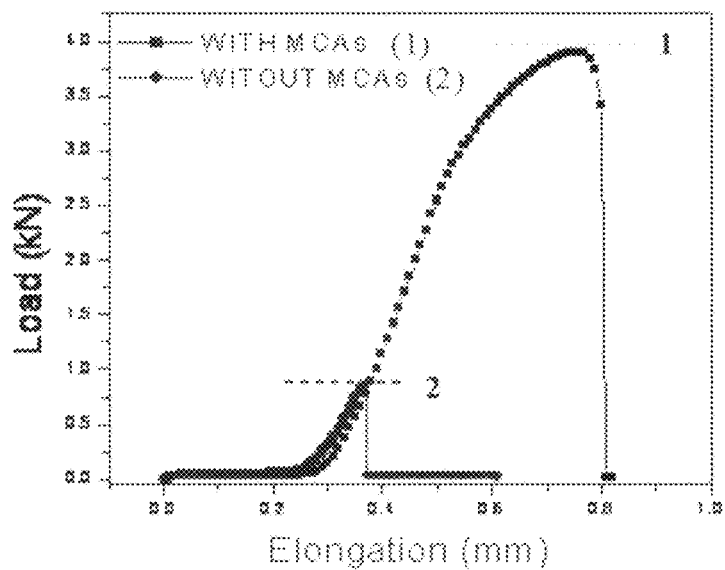
FIG. 9 is load-elongation plots for adhesive-bonded titanium samples with and without MCA.

The results show that in these highly developed surfaces the joint failure moves away from the interfaces and into the bulk of the adhesive layer. FIG. 8 is an SEM micrograph showing the surface of a fractured epoxy layer used to bond two MCA-structured Ti plates. This micrograph confirms that debonding did not occur at the adhesive/adherent boundary. Application of MCA process results in more than a 4-fold increase in the fracture strength as compared to the bonding of an unmodified surface, as shown in FIG. 9.

Figure 10:
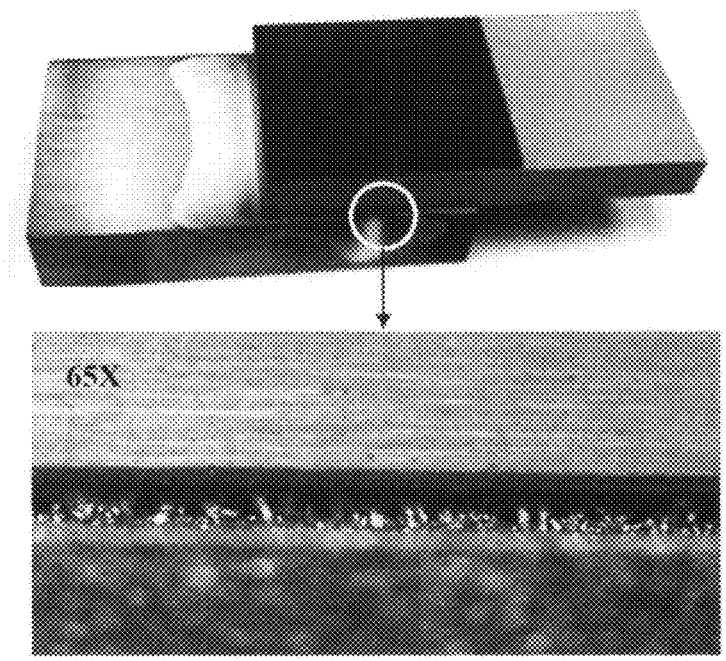
FIG. 10 shows a single lap configuration of a titanium alloy coupon brazed to a Intrinsically Reinforced Barium Alumo-Silicate (IRBAS) ceramic coupon using a conventional furnace.

Applicability of the MCA surface modification for high-temperature brazing of dissimilar materials was investigated on bonding between 6-2-4-2 Ti alloy and IRBAS ceramic. This material combination is widely used in several military and space applications. In particular, these materials are currently used for attachment of ceramic radomes to metallic missile bodies. In experiments, rectangular 1"×2"×¼" coupons were bonded in a conventional vacuum tube furnace using a singe lap configuration, which are exemplified by FIG. 10. Brazing alloy Incusil ABA from Wesgo Metals in a 0.003" thick foil form was used between the Ti alloy and IRBAS coupons that were pressed together and heated in a vacuum furnace to a temperature up to 500° C. using a procedure recommended by the Morgan Advanced Ceramics Corp.

Figure 11:
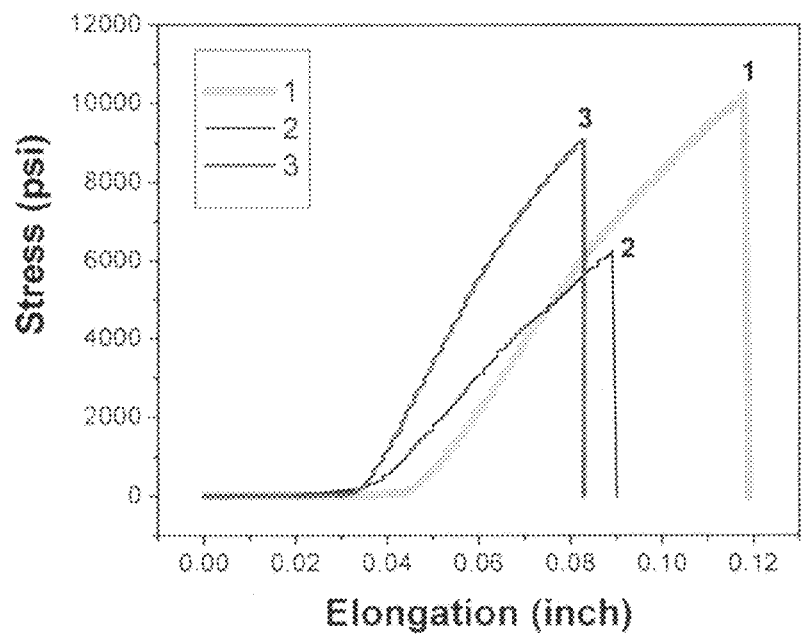
FIG. 11 shows stress-elongation plots for plain titanium alloy samples brazed in a conventional furnace to ceramic samples both with MCA and without MCA (plain).

The first set included samples with unstructured Ti alloy and IRBAS ceramic surfaces, as well as samples with a MCA-structured IRBAS ceramic surface and unstructured Ti alloy surface. The second set included samples with both Ti alloy and IRBAS ceramic MCA-structured surfaces. The results achieved from laboratory shear stress testing of this set of samples, shown in FIG. 11, indicate an average of about 53% increase in the bond strength when using the MCA structuring of the ceramic surface only. In FIG. 11 lines 1 and 3 represent samples with MCA formed on the ceramic surface. Line 2 represents an untreated sample.

Figure 12:
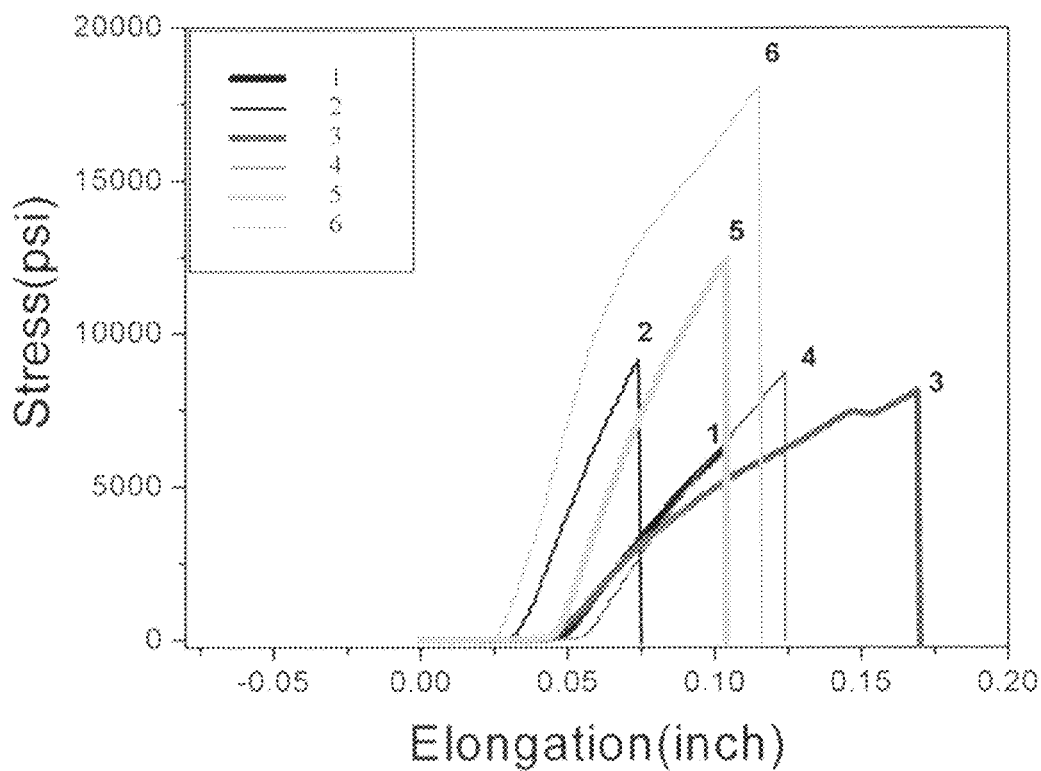
FIG. 12 shows stress-elongation plots for titanium alloy and IRBAS samples both without MCA (plain) and with MCA brazed together in a conventional furnace.

FIG. 12 shows the results of testing additional samples. For two samples, MCA were formed on the IRBAS ceramic surface only. For two samples, MCA were formed on both surfaces. The final two samples lacked MCA on either surface. The tests showed an increase of up to 90% with two treated surfaces compared to one treated surface. In FIG. 12, Lines 1 and 2 represent the plain (no MCA) samples. Lines 3 and 4 represent the samples with MCA on the ceramic surface only. Lines 5 and 6 represent samples with MCA on both surfaces.

In the above examples, the MCA were fabricated on the IRBAS surface using a pulsed 60 W Nd:YAG laser with a wavelength of 1064 nm and a computer-driven X-Y stage allowing displacement with an accuracy of 1 µm under radiation with the laser beam. Argon gas was found to be a suitable ambient media, and the basic parameters were: 2 scans, power 60% of the maximum, scan speed 4 mm/s, and step $\Delta y=25$ µm. While argon gas is the preferred ambient gas, other gases such as krypton, radon, xenon, and steam may be substituted. This arrangement required about 7.5 hours to prepare a 1"×1" surface area. For the fabrication of MCA on the 6-2-4-2 Ti alloy surface, methanol as an ambient (other low thermal conductivity alcohols can be used as well), 80% of the maximum laser power, a scan speed of 2 mm/s, and step Δy=30 μm were used. This arrangement required about 4 hours to prepare a 1"×½" surface area.

In summary, testing indicated strength values of up to 11,000 psi for shear tests on conventionally brazed MCA-structured samples and up to 1,926 psi for tensile tests of MCA-structured samples bonded with the NanoBond® process. There does not appear to be any similar experimental results in the published literature. For example, the highest strength obtained in experiments by Molitor P, Yong T, Int. J. Adhes. Adhes. 2002; 22: 101, on Ti alloy samples bonded by an epoxy "AF-3109-2K", which is widely used in aerospace industry, dispersed with glass fibers, and using extensive surface preparation, is 15.9 MPa. The result shows that the limiting factor in the total bond strength is the adhesive strength. These observations indicate the possibility of replacing the adhesive with a brazing alloy to develop a joint between metals and ceramics capable of withstanding high temperatures.

Although the present invention has been described with respect to specific details, it is not intended that such details should be regarded as limitations on the scope of the invention, except as and to the extent that they are included in the accompanying claims.

We claim:

1. A method for bonding a first object to a second object comprising:
    forming a micro-column array on a surface of at least one of the objects wherein the micro-column array is formed by laser treatment of the surface;
    providing a source of heat separate from the laser used to treat the surface of at least one of the objects;
    preheating the surface with the source of heat prior to or concurrently with the laser treatment;
    positioning a bonding material between the first and second objects; and
    bonding the first object to the second object.

2. The method of claim 1 wherein the preheating is performed with a continuous wave laser.

3. The method of claim 1 wherein the bonding material is a reactive composite material and initiating an exothermic reaction in the reactive composite material.

4. The method of claim 1 further comprising controlling the chemical composition of a surface where the micro-column array is formed by maintaining one or more selected fluids in contact with the surface during micro-column array formation.

5. The method of claim 4 wherein a selected fluid reacts with the surface and/or another selected fluid to modify the chemical composition of the surface.

6. The method of claim 1 wherein the surface on which the MCA is formed comprises Fe, Si, Ge, Ag, Au, W, Mo, Ta, Nb, V2O5, Ni, stainless steel alloys, Ti or Ti alloys, or Aluminum Nitride, Silicon Carbide, Barium Aluminum Silicate, or Intrinsically Reinforced Barium Alumo-Silicate ceramics.

7. The method of claim 1 wherein the bonding material comprises braze, solder, and/or adhesive.

8. The method of claim 1 further comprising controlling the chemical composition of a surface where the micro-column array is formed by maintaining a vacuum in contact with the surface during micro-column array formation.

* * * * *